(12) United States Patent
Kuhn et al.

(10) Patent No.: US 6,459,490 B1
(45) Date of Patent: Oct. 1, 2002

(54) DUAL FIELD OF VIEW OPTICAL SYSTEM FOR MICROSCOPE, AND MICROSCOPE AND INTERFEROMETER CONTAINING THE SAME

(75) Inventors: William P. Kuhn, Tucson, AZ (US); Robert E. Parks, Tucson, AZ (US)

(73) Assignee: Optical Perspectives Group, L.L.C., Tucson, AZ (US)

( * ) Notice: Subject to any disclaimer, the term of this patent is extended or adjusted under 35 U.S.C. 154(b) by 0 days.

(21) Appl. No.: 09/580,473

(22) Filed: May 26, 2000

Related U.S. Application Data

(60) Provisional application No. 60/137,061, filed on Jun. 1, 1999.

(51) Int. Cl.[7] .................................................. G01B 9/02
(52) U.S. Cl. ........................................ 356/520; 359/370
(58) Field of Search ................................ 356/450, 520, 356/511; 359/368, 370

(56) References Cited

U.S. PATENT DOCUMENTS 4,439,010 A * 3/1984 Doty .......................... 359/368

OTHER PUBLICATIONS

Handbook of Optics, McGraw–Hill, Inc., $2^{nd}$ ed., vol. II, pp. 21.2–21.7 (1995).
Nikon: The Scientific Source, (Jan. 1995).
Nikon: Optiphot Series, (Oct. 1994).

* cited by examiner

Primary Examiner—Samuel A. Turner
(74) Attorney, Agent, or Firm—David W. Collins

(57) ABSTRACT

A dual field of view optical system and a single, lower cost detector are utilized, rather than using a large CCD camera or multiple CCD cameras, to view a sample that has two or more small areas that need to be measured, which are too far apart to fall on the detector but are within the field of view of the objective, or to measure a long, narrow strip that is too long for the detector, but whose total area is less than the detector area. The dual field of view optical system is employed in a microscope which comprises: (1) an illuminator arm with an illumination source and a field stop, (2) a beam splitter, (3) an objective, (4) a sample plane for location of a sample to be observed, and (5) a detector arm, with the illuminator arm configured to illuminate the sample plane through the beam splitter and the objective and with the detector arm configured to receive an image of the sample and including the dual field of view optical system. The dual field of view optical system comprises two beam splitters, two mirrors and one detector, the two beam splitters in the same plane and the mirrors disposed on either side of the beam splitters, an entrance portion for receiving the image from the sample and an exit portion for directing the image onto the detector.

31 Claims, 5 Drawing Sheets

DUAL FIELD OF VIEW OPTICAL SYSTEM FOR MICROSCOPE, AND MICROSCOPE AND INTERFEROMETER CONTAINING THE SAME

CROSS-REFERENCE TO RELATED APPLICATION

The present application is a non-provisional application, and claims priority based on provisional application, Ser. No. 60/137,061, filed on Jun. 1, 1999.

TECHNICAL FIELD

The present invention is directed generally to optical microscopy and in particular addresses the need to handle a sample that has two or more small areas that need to be measured, which are too far apart to fall on the detector but are within the field of view of the objective or measure a long, narrow strip that is too long for the detector, but whose total area is less than the detector area.

BACKGROUND ART

In the design of optical inspection equipment, it is necessary to balance cost and flexibility of the instrument. A great deal of optical inspection equipment is based upon commercially available microscopes or microscope objectives and an electronic area detector (see FIG. 1). However, the designs of most optical microscope objectives permit their use in a visual instrument. Industrial and biological microscopes made by manufacturers such as Nikon, Olympus, Zeiss and Leica, produce images of good quality with a 20 to 25-mm diameter. The eyepieces used on these microscopes further magnify the 20 to 25-mm diameter image for viewing by the eye.

In many industrial applications, an array detector such as a CCD camera is placed at the image plane rather than an eyepiece. Typical CCD detectors have a rectangular outline and fit within an 8-mm diameter circle (½ inch format). It is possible, in many applications to select an objective and detector such that sufficient resolution is obtained over a large enough area. However, there are cases in which the area on a sample to be tested does not fit within the detector area but does fit within the field of view of the objective. Simply put, the detector is too small.

One solution to the problem of a too small detector is simple: buy a bigger detector; however, this solution can be cost prohibitive as well as too slow because of reduced detector frame rates. Another solution is to build a mosaic of small detectors to fill the required image area. Of course, one may also scan the sample, building up a mosaic of data sets that must be registered via computer processing. However, scanning a sample greatly increases the required, hardware, software and time required to measure a sample.

What is needed is an optical system that can handle a sample that has two or more small areas that need to be measured, which are too far apart to fall on the detector but are within the field of view of the objective. Similarly, what is needed is an optical system that is capable of measuring a long, narrow strip that is too long for the detector, but whose total area is less than the detector area.

DISCLOSURE OF INVENTION

In accordance with the present invention, rather than using a large CCD camera or multiple CCD cameras to meet the above-stated needs, a dual field of view optical system and a single, lower cost detector are utilized.

Specifically, a dual field of view optical system for use in a microscope comprising: (1) an illuminator arm with an illumination source, (2) a beam splitter, (3) an objective, (4) a sample plane for location of a sample to be observed, (5) a detector arm including a detector located at an image plane, with the illuminator arm configured to illuminate the sample plane through the beam splitter and the objective and with the detector arm configured to receive an image of the sample and including the dual field of view optical system, and either (6a) a field stop in the illumination arm or (6b) a field stop at the image plane with additional relay optics. The dual field of view optical system comprises two beam splitters, two mirrors and one detector, with the two beam splitters in the same plane and the mirrors disposed on either side of the beam splitters, an entrance portion for receiving the image from the sample and an exit portion for directing the image onto the detector.

Further in accordance with the present invention, a microscope comprising the elements enumerated above further comprises the dual field of view optical system. Alternatively, an interferometer comprising (1) suitable imaging optics in place of the objective and (2) a reference arm may be constructed employing the dual field of view optical system.

The dual field of view optical system permits (1) viewing a sample that has two or more small areas that need to be measured, which are too far apart to fall on the detector but are within the field of view of the objective and (2) measuring a long, narrow strip that is too long for the detector, but whose total area is less than the detector area.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

Figure 1:
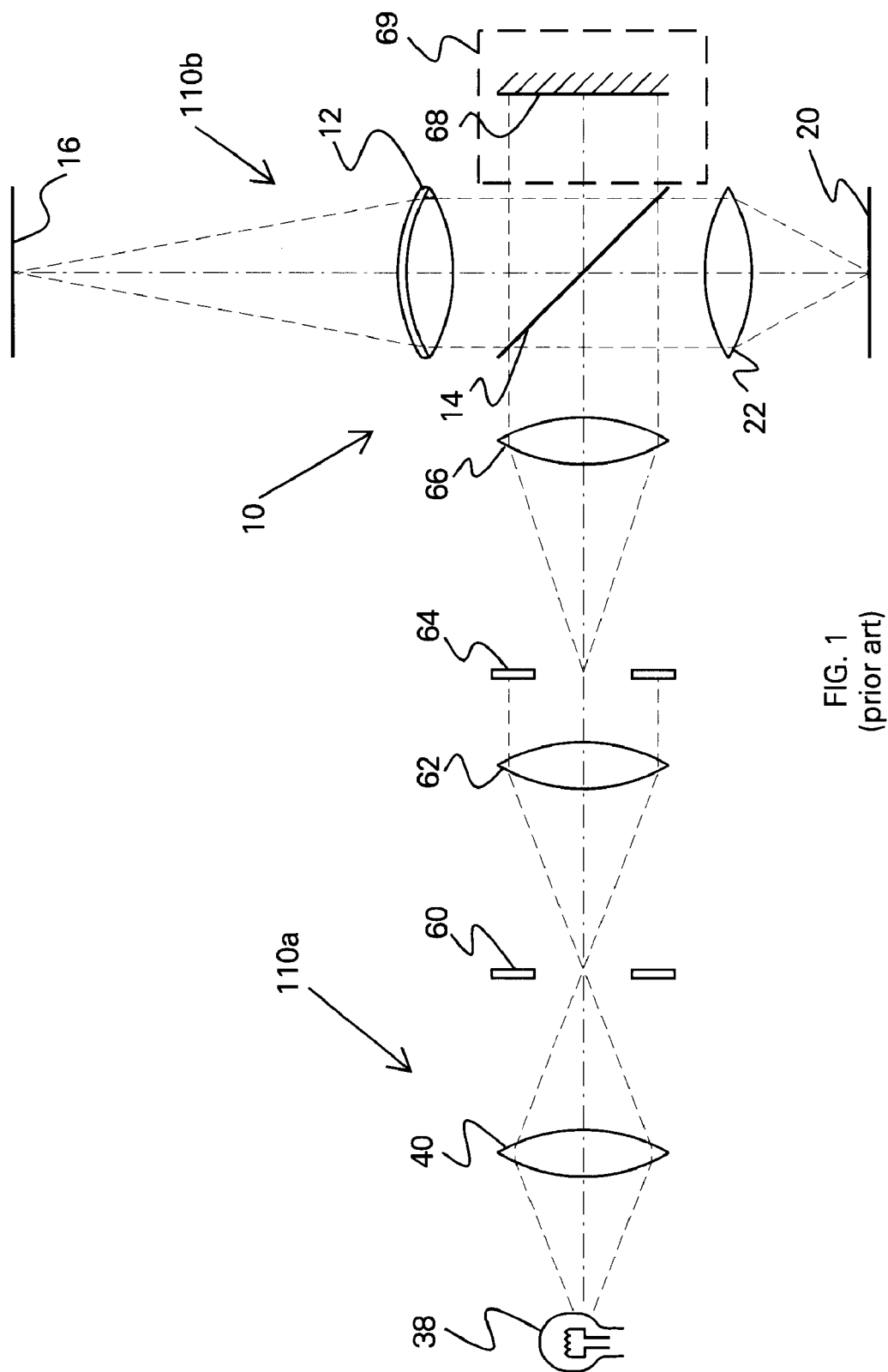
FIG. 1 is a schematic diagram of a microscope with illuminator having a projected field stop.

FIG. 1 depicts the elements of a basic microscope 10, which includes an illumination source 38, a first condenser lens 40, an aperture stop 60, a second lens 62 that projects the aperture stop, a field stop 64, a third lens 66 that projects the field stop onto the sample and images the aperture stop onto a pupil of an objective 22, a beam splitter 14, a tube lens 12, a detector at an image plane 16, and an optional mirror 68. The illumination of the sample 20 is generated in the illumination arm 110a of the microscope 10. The beam splitter 14 couples the illumination onto the sample 20 and the resulting illuminated image is directed to the detector 16 in the detector arm 110b.

The apparatus 10 depicted in FIG. 1 can instead be constructed as an interometer by omitting the objective 22 and using suitable imaging optics in its place, along with including a reference arm 69. Such imaging optics and reference arms for interferometers are well-known.

The illumination source 38 can be a laser, light emitting diode, or incandescent source. The microscope objective 22 is typically an infinite conjugate objective, but this is not necessarily the case. The tube lens 12 is used for focusing if an infinite conjugate objective 22 is used. The detector 16 is typically a CCD camera. A sample 20 is in the usual location relative to the objective lens 22.

Figure 2A:
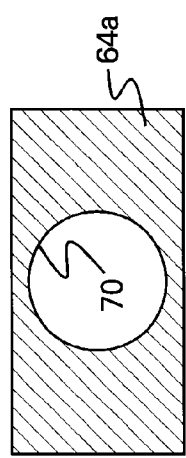
FIGS. 2a–2d are schematic diagrams of fixed, adjustable, rectangular and multiple aperture field stops, respectively.
Figure 2B:
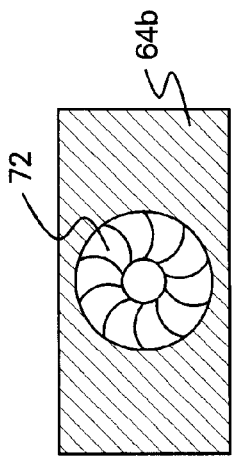
Figure 2C:
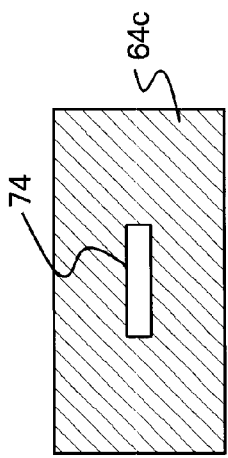
Figure 2D:
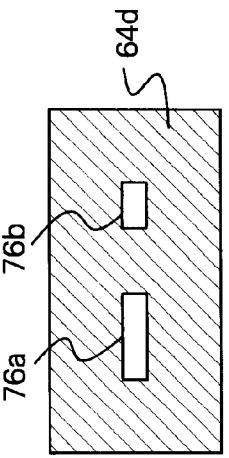

FIGS. 2a–2d depict various configurations for field stop 64: the field stop 64a of FIG. 2a is a fixed open circle 70; the field stop 64b of FIG. 2b comprises adjustable, multiple blades 72; the field stop 64c of FIG. 2c depicts a rectangular slot 74; and the field stop 64d of FIG. 2d comprises multiple apertures 76a, 76b.

Figure 3:
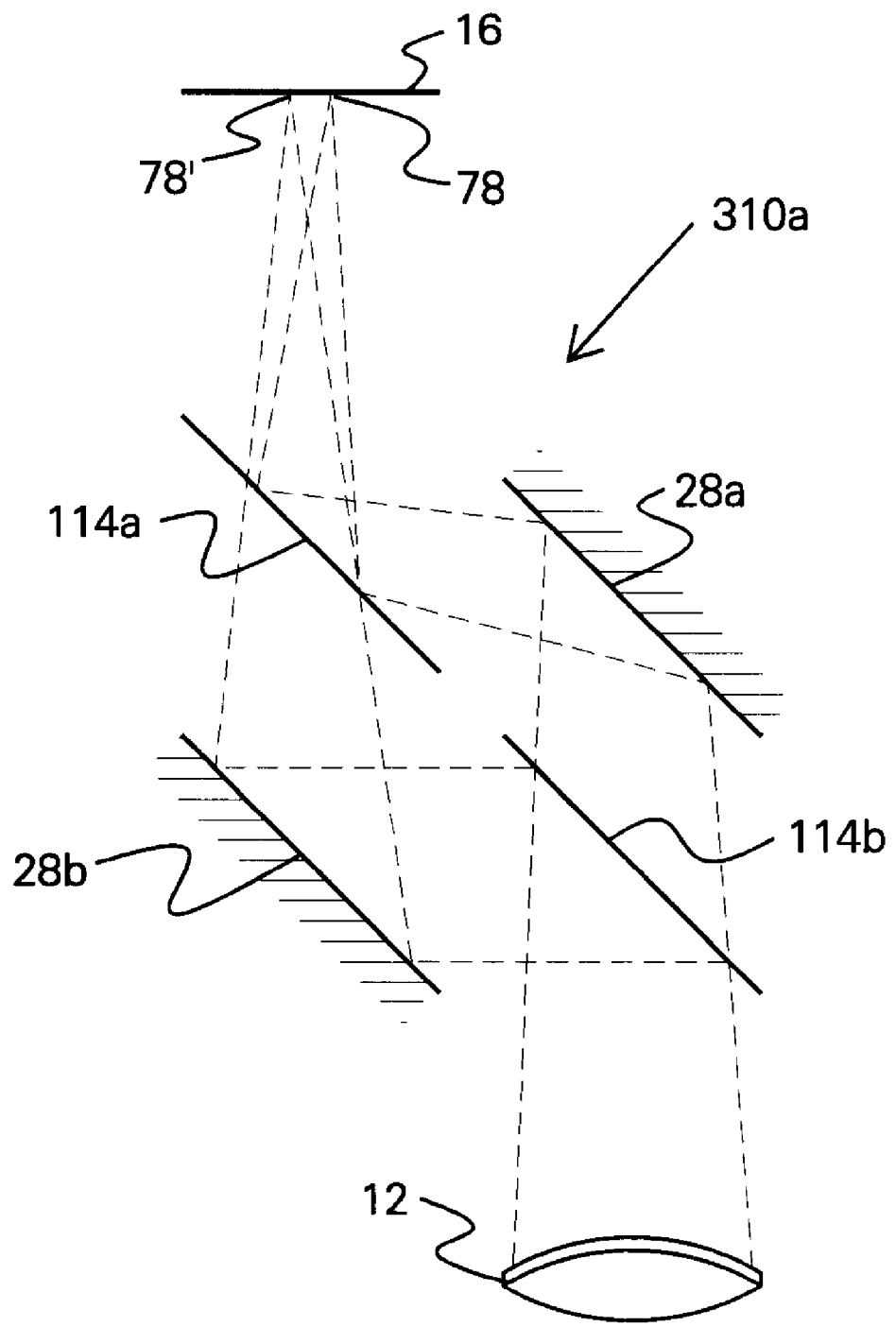
FIG. 3 depicts dual field of view (DFOV) optics shown with a schematic imaging or tube lens and detector.

Referring to FIG. 3, a schematic diagram of a dual field of view (DFOV) optical system 310a in accordance with the present invention is shown. The system 310a begins with element 12, which is the tube lens from the microscope 10 in FIG. 1. Following the tube lens 12 is a beam splitter 114a, two mirrors 28a, 28b, and another beam splitter 114b. Finally, two images, 78 and 78' are created at detector location 16. By suitably adjusting or mounting the two mirrors 28a, 28b, the images 78 and 78' can be made to coincide or be displaced relative to each other a desired amount. To produce a useable image on the detector 16, it is necessary for a field stop 64, in particular, 64c or 64d, to be projected onto the sample 20 so that portions of the sample that are not of interest are not visible on the detector.

A field stop 64 can be placed in the illumination arm 110a of a microscope 10 at the location in indicated in schematic form in FIG. 1. A typical microscope 10 will have either a fixed size field stop 64a as in FIG. 2a or an adjustable field stop 64b made up of multiple blades 72 as in FIG. 2b. Typically, the position of the field stop 64 is adjustable so that it can be centered in the image. For the disclosed purpose, a field stop 64c may be a long slit 74 as in FIG. 2c or the field stop 64d may comprise two or more apertures 76a, 76b as in FIG. 2d. The size as well as position of a rectangular field stop may also be adjustable or interchangeable for different samples.

Figure 4:
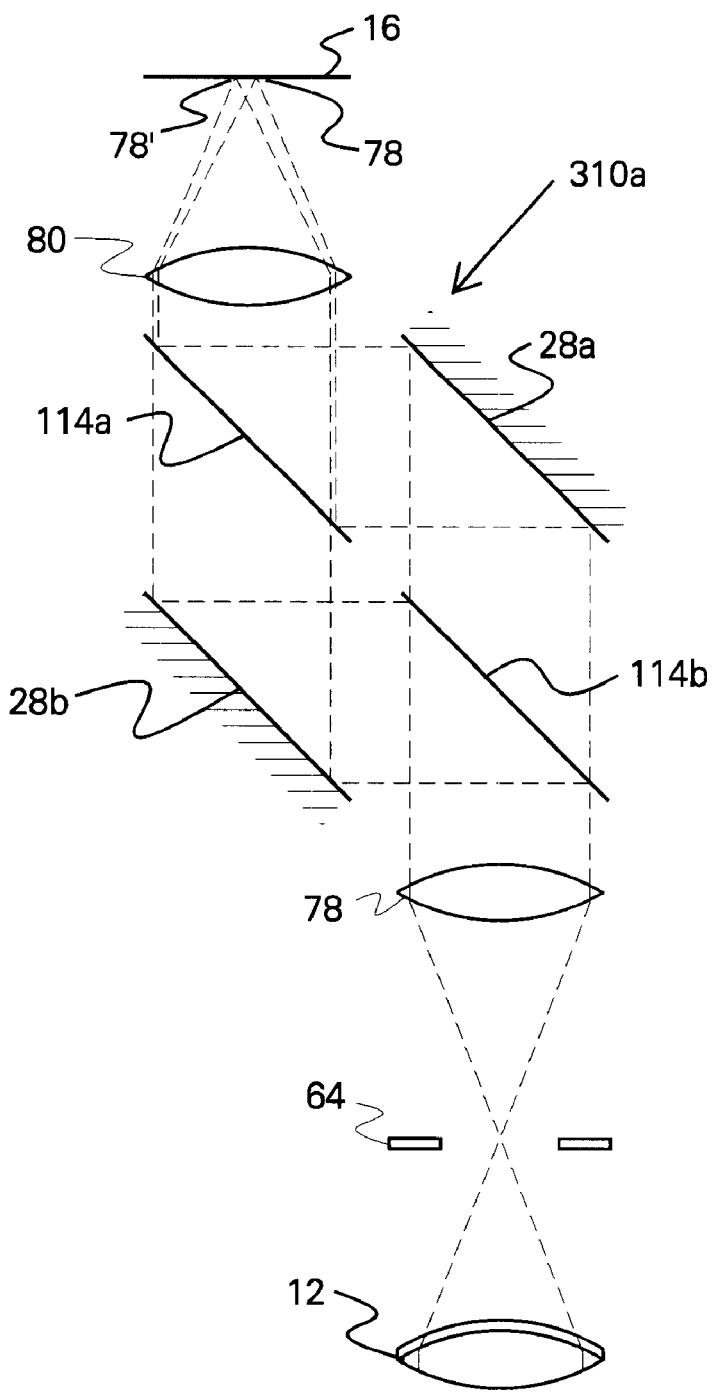
FIG. 4 depicts dual field of view optics incorporating image relay optics and a field stop at an intermediate image plane.

An alternative implementation of the DFOV optics of the present invention is shown in FIG. 4. This embodiment is appropriate for situations where it is impractical or undesirable to include the field stop in the illumination arm or when it is desired to attach a DFOV optical system as a module to an existing microscope. In this embodiment, location 64 is an image plane. Additional optics 78 or 80, e.g., lenses, or both are added to relay the image onto the detector 16 and provide the space to insert the DFOV optics between the initial image plane 64 and the detector 16. The lens 78 or 80 may also be integrated into the DFOV optical module 310a rather than as separate or external components. A field stop aperture 64 may be placed at location 64 or may remain in the illumination arm. Alternatively, some samples may not need a field stop because of their particular design.

The DFOV optical module 310a disclosed herein may be used with any microscope type such as polarization, interference or differential interference contrast. Additionally, microscopes incorporating Michelson, Mirau, or Linnik objectives and used in phase shifting or short coherence ("White-Light") interferometry can employ the DFOV optics 310a of the present invention. Other types of interferometers that are not necessarily setup as a microscope can also benefit from the DFOV optics 310a, such as Twyman-Green, Fizeau, Michelson, Shack-cube, and Mach-Zehnder interferometers.

Specific example applications include the measurement of small mechanical components, such as hard-disk read-write heads that have two different features that must be compared against each other. Other applications include the testing of cylinder lenses or other lenses with a high aspect ratio outline. Another specific application is the measurement of fiber optic connectors for multiple fibers such as MT, MTP, MPO or MT-RJ connectors. MT connectors sample regions are about 4 by 1-mm. However, a CCD camera is typically 1:1 or 4:3 ratio of width to height. If an image is acquired of a MT connector that includes the entire sample width, the resolution is low. The alternatives are to use a larger detector, to scan, or to use the DFOV optics 310a and a single detector 16.

Figure 5:
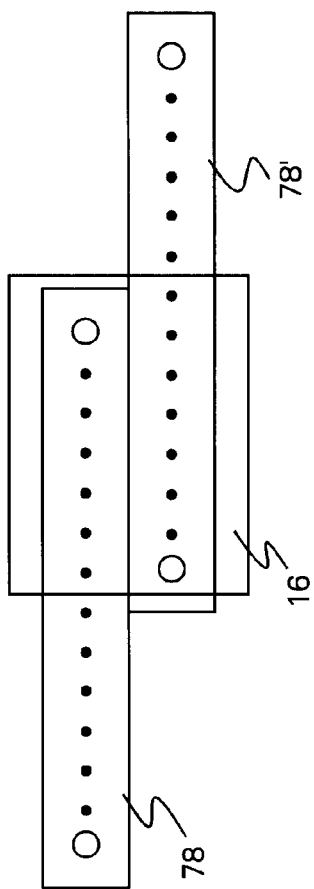
FIG. 5 is a schematic diagram showing how two images of an MT fiber optic connector could be positioned on a single detector so that the entire object is visible in a single image.

Referring to FIG. 5, shown schematically are two images of a single MT connector produced by an optical system employing the DFOV optics module of the present invention. The two images (78 and 78') are arranged such that part of both images fall on the detector 16 and a single frame of data from the detector can be used to produce an image of the entire sample. The image can be a normal image or an interference image or any other imaging modality of interest.

Figure 6:
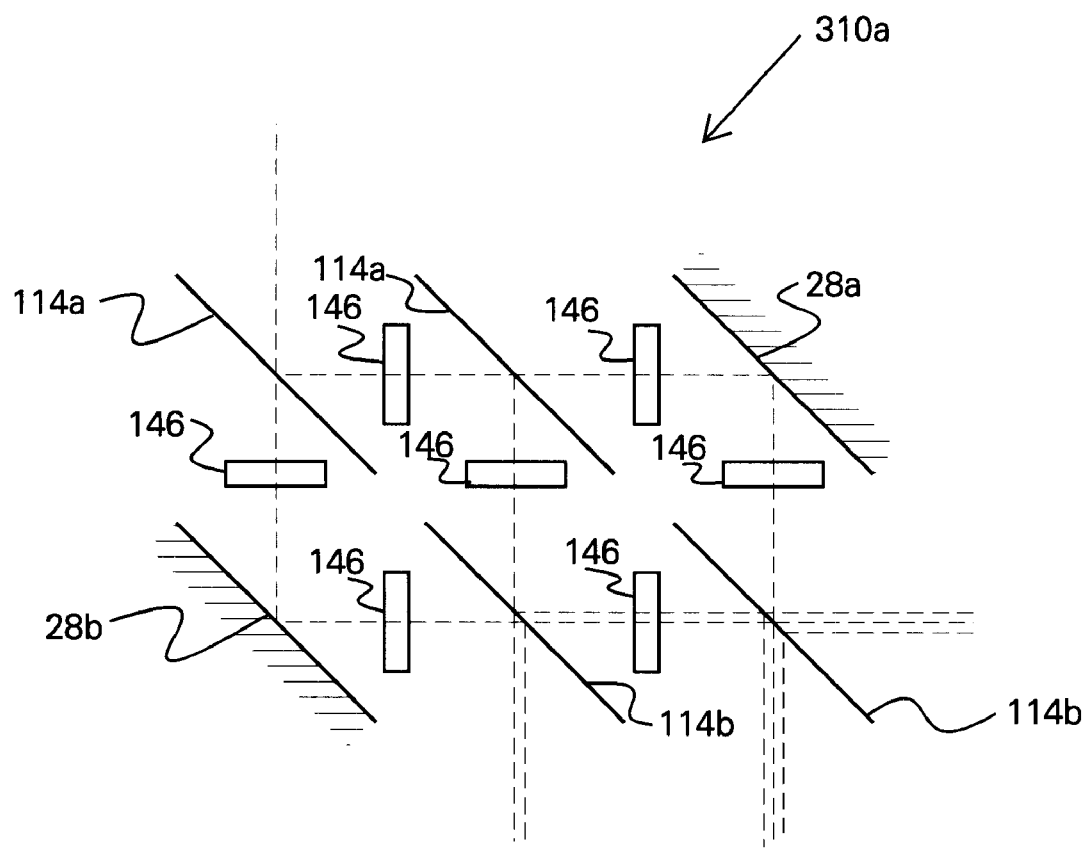
FIG. 6 is a schematic diagram showing how to extend a DFOV optics to multiple fields of view and how to use optional deviation prisms to control final image position.

The DFOV optical concept disclosed herein can be extended to multiple fields of view (FIG. 6). For each additional field of view that is desired, a second pair of beam splitters 114a, 114b is added. This can be useful for imaging very long, narrow objects. Additionally, it is possible to control the position of the individual images by the orientation (tip and tilt) of both beam splitters 114a, 114b and mirrors 28a, 28b. However, it is also possible to use beam deviation prisms 146 in the optical path to control the image positions.

Figure 7:
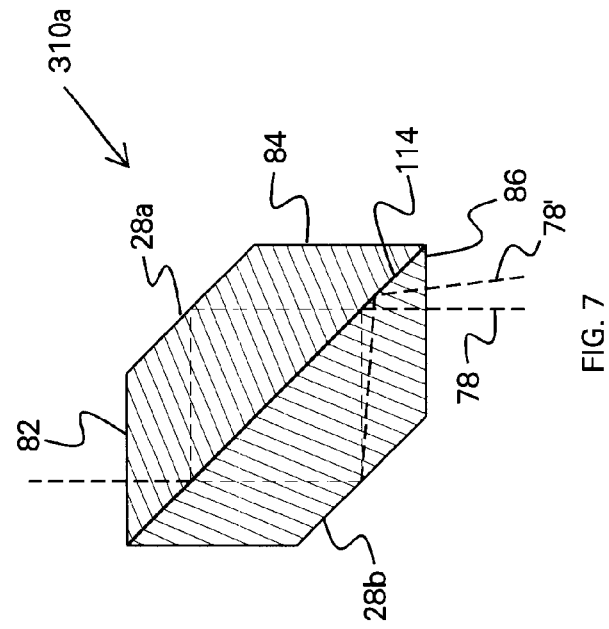
FIG. 7 is a schematic diagram showing a solid DFOV optical system.

Finally, it is also possible to build solid optical versions of the DFOV or other optical systems. Examination of FIG. 7 shows the use of two prisms 246a, 246b to construct a DFOV optics module 310a. The entrance face 82 and exit faces 84, 86 may be anti-reflection coated. One of the two mating surfaces of the prisms is coated to function as a beam splitter 114. The mirrors 28a, 28b may be uncoated to use total internal reflection or coated with a reflective coating. It is also possible to use a partially reflective surface if the need for an additional beam sampling function is required. The displacement of the final images is controlled by the angle of the mirror surfaces and is fixed. A lack of adjustment reduces flexibility but has benefits if a very rugged device is desired.

Thus, there has been disclosed a dual field of view optics system. It will be readily apparent to those skilled in this art that various changes and modifications of an obvious nature may be made, and all such changes and modifications are considered to fall within the scope of the present invention, as defined by the appended claims.

What is claimed is:

1. A dual field of view optical system in a microscope comprising: (1) an illuminator arm with an illumination source, (2) a beam splitter, (3) an objective, (4) a sample plane for location of a sample to be observed, (5) a detector arm including a detector located at an image plane, and either (6a) a field stop in the illumination arm or (6b) a field stop at the image plane with additional relay optics, with the illuminator arm configured to illuminate the sample plane through the beam splitter and the objective and with the detector arm configured to receive an image of the sample and including the dual field of view optical system, the dual field of view optical system comprising two beam splitters, two mirrors and the detector, the two beam splitters in the same plane and the mirrors disposed on either side of the beam splitters, an entrance portion for receiving the image from the sample and an exit portion for directing the image onto the detector, wherein light from the sample is incident on the first beam splitter, which splits into two portions, each portion of the light being directed to a said mirror, thereby forming two light paths, and wherein each mirror in turn directs the light to the second beam splitter, the second beam splitter directing a portion of the light from each of the two paths to the detector such that the two light paths each produce an image on the detector that is displaced from the other.

2. The dual field of view optical system of claim 1 further comprising relay optics disposed at the entrance portion or the exit portion or both.

3. The dual field of view optical system of claim 1 further comprising at least one additional pair of beam splitters, the pair of beam splitters in the same plane, parallel to the plane of the two beam splitters, with the two beam splitters and the additional pair of beam splitters disposed between the two mirrors, wherein light from the sample is incident on the first beam splitter, which splits into two portions, one portion of the light is directed to a mirror and then transmitted through two or more beam splitters to the output, the second portion of light is directed to a beamsplitter which in turn splits the light in to two subportions, one subportion of which is directed to a mirror, the other subportion is directed towards a beamsplitter, the two subportions are each directed to a final beamsplitter one is transmitted and the other reflected, and three or more paths are directed to the detector, each path producing an image on the detector displaced from the others.

4. The dual field of view optical system of claim 3 further including beam deviation prisms located in the optical path between beam splitters and mirrors for controlling the displacement of the images from each other on the detector.

5. The dual field of view optical system of claim 1 comprising a modular optical component, comprising two prisms configured to form the two beam splitters and the two mirrors, thereby eliminating air spaces between the beam splitters and the mirrors, wherein a beam splitting coating is applied to one of the two mating surfaces of the prisms and the mirrors are formed either by total internal reflection or a reflective coating applied to the two prism surfaces near parallel to the mating surfaces.

6. A microscope comprising: (1) an illuminator arm with an illumination source, (2) a beam splitter, (3) an objective, (4) a sample plane for location of a sample to be observed, (5) a detector arm including a detector located at an image plane, and either (6a) a field stop in the illumination arm or (6b) a field stop at the image plane with additional relay optics, with the illuminator arm configured to illuminate the sample plane through the beam splitter and the objective and with the detector arm configured to receive an image of the sample, wherein the detector arm is comprised of (i) a dual field of view optical system comprising two beam splitters and two mirrors and (ii) the detector, with the two beam splitters in the same plane and the mirrors disposed on either side of the beam splitters, an entrance portion for receiving the image from the sample and an exit portion for directing the image onto the detector, wherein light from the sample is incident on the first beam splitter, which splits into two portions, each portion of the light being directed to a said mirror, thereby forming two light paths, and wherein each mirror in turn directs the light to the second beam splitter, the second beam splitter directing a portion of the light from each of the two paths to the detector such that the two light paths each produce an image on the detector that is displaced from the other.

7. The microscope of claim 6 wherein the dual field of view optical system further comprises relay optics disposed at the entrance portion or the exit portion or both.

8. The microscope of claim 6 wherein the dual field of view optical system comprises at least one additional pair of beam splitters, the pair of beam splitters in the same plane, parallel to the plane of the two beam splitters, with the two beam splitters and the additional pair of beam splitters disposed between the two mirrors, wherein light from the sample is incident on the first beam splitter, which splits into two portions, one portion of the light is directed to a mirror and then transmitted through two or more beam splitters to the output, the second portion of light is directed to a beamsplitter which in turn splits the light in to two subportions, one subportion of which is directed to a mirror, the other subportion is directed towards a beamsplitter, the two subportions are each directed to a final beamsplitter one is transmitted and the other reflected, and three or more paths are directed to the detector, each path producing an image on the detector displaced from the others.

9. The microscope of claim 8 wherein the dual field of view optical system further includes beam deviation prisms located in the optical path between beam splitters and mirrors for controlling the displacement of the images from each other on the detector.

10. The microscope of claim 6 wherein the dual field of view optical system comprises a modular optical component, comprising two prisms configured to form the two beam splitters and the two mirrors, thereby eliminating air spaces between the beam splitters and the mirrors, wherein a beam splitting coating is applied to one of the two mating surfaces of the prisms and the mirrors are formed either by total internal reflection or a reflective coating applied to the two prism surfaces near parallel to the mating surfaces.

11. The microscope of claim 6 wherein the microscope is an interference microscope.

12. The microscope of claim 11 wherein the interference microscope uses a Michelson, Mirau or Linnik configuration.

13. The microscope of claim 12 wherein the interference microscope is a differential interference contrast microscope.

14. The microscope of claim 12 wherein the interference microscope is phase shifting.

15. The microscope of claim 6 wherein the illumination source is a short coherence source.

16. The microscope of claim 6 wherein the microscope includes an interferometer.

17. The microscope of claim 16 wherein the interferometer is a Twyman-Green, Michelson, Fizeau, Shack-cube, or Mach-Zehnder type.

18. The microscope of claim 16 wherein the interferometer is phase shifting.

19. The microscope of claim 16 wherein the interferometer uses a short coherence source.

20. The microscope of claim 6 wherein the microscope is of infinite conjugate design and the dual field of view optical system is between the tube lens and the image plane.

21. The microscope of claim 6 wherein the microscope is of infinite conjugate design and the dual field of view optical system is between the beam splitter and the tube lens.

22. The microscope of claim 6 wherein the sample is a high aspect ratio, approximately or nominally rectangular object and the field stop image is rectangular and approximately the same size as the entire region of interest.

23. The microscope of claim 22 wherein the sample is a fiber optic connector selected from the group consisting of MT, MT-RJ, MTP, and MPO connectors.

24. An interferometer comprising: (1) an illuminator arm with an illumination source, (2) a beam splitter, (3) imaging optics, (4) a sample plane for location of a sample to be observed, (5) a detector arm including a detector located at an image plane, (6) a reference arm to provide a reference comparison for an image received in the detector arm, and either (7a) a field stop in the illumination arm or (7b) a field stop at the image plane with additional relay optics, with the illuminator arm configured to illuminate the sample plane through the beam splitter and the objective and with the detector arm configured to receive an image of the sample, wherein the detector arm is comprised of (i) a dual field of view optical system comprising two beam splitters and two mirrors and (ii) the detector, with the two beam splitters in the same plane and the mirrors disposed on either side of the beam splitters, an entrance portion for receiving the image from the sample and an exit portion for directing the image onto the detector, wherein light from the sample is incident on the first beam splitter, which splits into two portions, each portion of the light being directed to a said mirror, thereby forming two light paths, and wherein each mirror in turn directs the light to the second beam splitter, the second beam splitter directing a portion of the light from each of the two paths to the detector such that the two light paths each produce an image on the detector that is displaced from the other.

25. The interferometer of claim 24 wherein the interferometer is a Twyman-Green, Michelson, Fizeau, Shack-cube, or Mach-Zhender type.

26. The interferometer of claim 24 wherein the interferometer is phase shifting.

27. The interferometer of claim 24 wherein the interferometer uses a short coherence source.

28. The interferometer of claim 24 wherein the dual field of view optical system further comprises relay optics disposed at the entrance portion or the exit portion or both.

29. The interferometer of claim 24 wherein the dual field of view optical system comprises at least one additional pair of beam splitters, the pair of beam splitters in the same plane, parallel to the plane of the two beam splitters, with the two beam splitters and the additional pair of beam splitters disposed between the two mirrors, wherein light from the sample is incident on the first beam splitter, which splits into two portions, one portion of the light is directed to a mirror and then transmitted through two or more beam splitters to the output, the second portion of light is directed to a beamsplitter which in turn splits the light in to two subportions, one subportion of which is directed to a mirror, the other subportion is directed towards a beamsplitter, the two subportions are each directed to a final beamsplitter one is transmitted and the other reflected, and three or more paths are directed to the detector, each path producing an image on the detector displaced from the others.

30. The interferometer of claim 29 wherein the dual field of view optical system further includes beam deviation prisms located in the optical path between beam splitters and mirrors for controlling the displacement of the images from each other on the detector.

31. The interferometer of claim 24 wherein the dual field of view optical system comprises a modular optical component, comprising two prisms configured to form the two beam splitters and the two mirrors, thereby eliminating air spaces between the beam splitters and the mirrors, wherein a beam splitting coating is applied to one of the two mating surfaces of the prisms and the mirrors are formed either by total internal reflection or a reflective coating applied to the two prism surfaces near parallel to the mating surfaces.

\* \* \* \* \*